United States Patent [19]
Kumagai

[11] Patent Number: 6,034,937
[45] Date of Patent: Mar. 7, 2000

[54] OPTICAL DISC REPRODUCTION METHOD AND OPTICAL DISC REPRODUCTION APPARATUS

[75] Inventor: Eiji Kumagai, Kanagawa, Japan

[73] Assignee: Sony Corporation, Tokyo, Japan

[21] Appl. No.: 09/005,795

[22] Filed: Jan. 12, 1998

[30] Foreign Application Priority Data

Jan. 10, 1997 [JP] Japan .................... P09-003372

[51] Int. Cl.⁷ .................................................. G11B 7/00
[52] U.S. Cl. .................. 369/59; 369/124; 369/58
[58] Field of Search ........................ 369/124, 54, 58, 369/59, 60

[56] References Cited

U.S. PATENT DOCUMENTS

| | | | |
|---|---|---|---|
| 4,700,334 | 10/1987 | Shinkai | 369/44.29 |
| 4,761,692 | 8/1988 | Yoshida et al. | 369/59 |
| 5,189,654 | 2/1993 | Minakuchi | 369/44.34 |
| 5,315,400 | 5/1994 | Kurata et al. | 369/58 |
| 5,351,226 | 9/1994 | Mizumoto et al. | 369/54 |
| 5,490,127 | 2/1996 | Ohta et al. | 369/54 |
| 5,563,858 | 10/1996 | Fuji | 369/44.28 |
| 5,623,479 | 4/1997 | Takahashi | 369/58 |
| 5,636,196 | 6/1997 | Kumagai | 369/124 |
| 5,703,852 | 12/1997 | Kumagai | 369/48 |
| 5,745,460 | 4/1998 | Tateishi | 369/58 |
| 5,757,745 | 5/1998 | Takeya | 369/58 |
| 5,790,493 | 10/1996 | Takeya et al. | 369/58 |

FOREIGN PATENT DOCUMENTS

| | | | |
|---|---|---|---|
| 58-155533 | 9/1983 | Japan | 369/32 |
| 4-351717 | 12/1992 | Japan | 369/58 |
| 5-342762 | 12/1993 | Japan | 369/58 |

*Primary Examiner*—Nabil Hindi
*Attorney, Agent, or Firm*—Limbach & Limbach L.L.P.

[57] ABSTRACT

The present invention provides an optical disc reproduction method and an optical disc reproduction apparatus capable of accurately extracting a BCA code without being affected by mirror modulation of an RF signal.

An RF signal is peak-held via a buffer consisting of an operational amplifier according to time constants of a capacitor and a resistor. This RF signals subjected to low pass filter processing by the capacitor and the resistor prior to a predetermined binarization, thus enabling extraction of a BCA signal form the aforementioned RF signal.

3 Claims, 13 Drawing Sheets

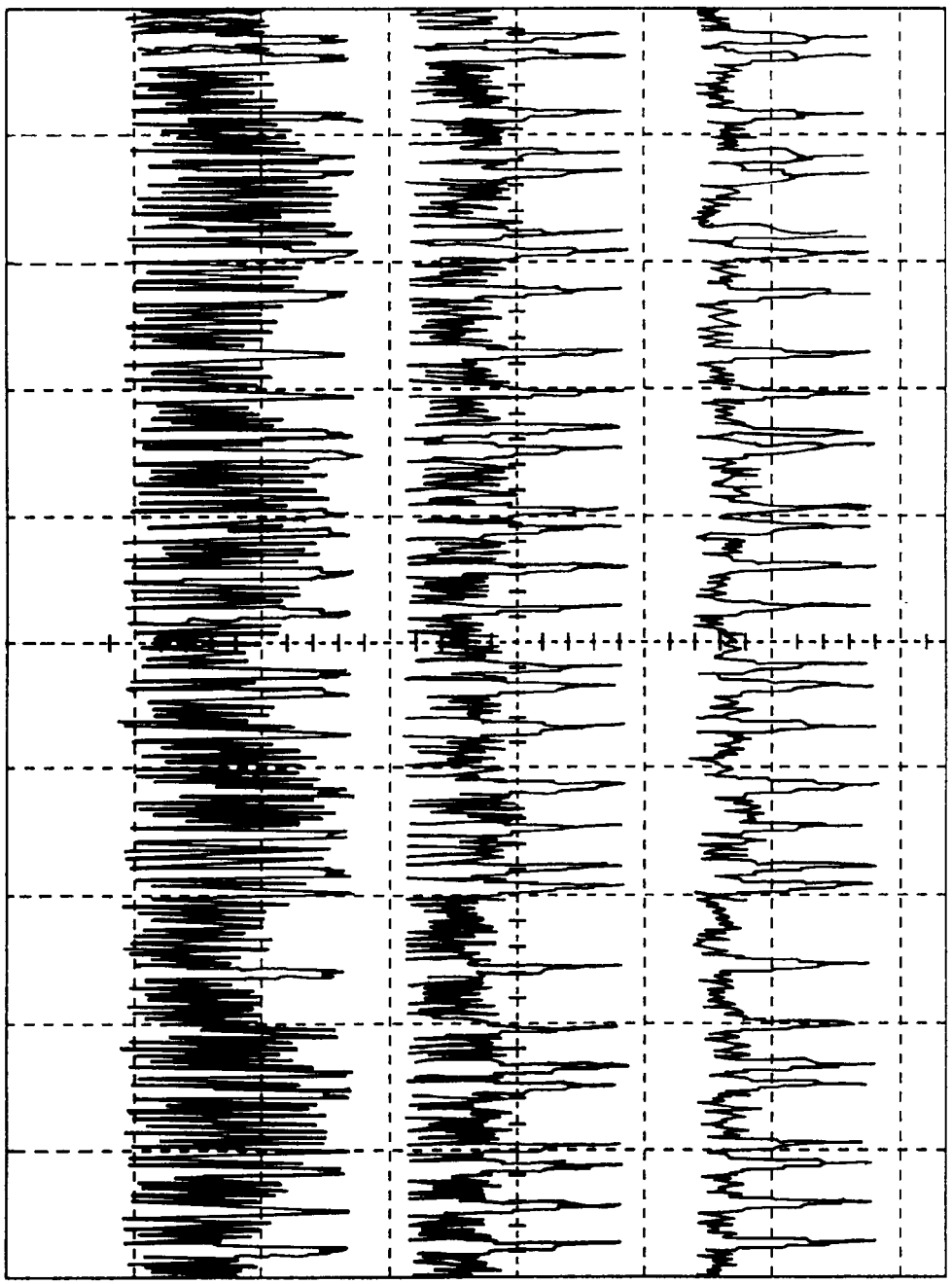

OPTICAL DISC REPRODUCTION METHOD AND OPTICAL DISC REPRODUCTION APPARATUS

BACKGROUND OF THE INVENTION

1. Field of the Invention

The present invention relates to an optical disc reproduction method and an optical disc reproduction apparatus for obtaining an optical disc identification information.

2. Description of the Prior Art

Currently, an optical disk recording medium called DVD (Digital Video Disc/Digital Versatile Disc) is under development. This DVD disc is capable or recording a wide range of data including a video data, audio data, and computer data. The DVD, in spite of its small size identical to a CD (Compact Disc), has a large recording capacity by the techniques of small-pitch recording tracks and data compression.

There are several DVD disc families such as a DVD-ROM (Read Only Memory) disc dedicated to reproduction; a DVD-R (Recordable) disc to which a data can be written once; and a DVD-RAM (Random Access Memory) disc.

In the development of the DVD-ROM disc, it has been suggested to provide a BCA (Burst Cutting Area) for the purpose of providing information for identifying each of the DVD-ROM discs.

A BCA code (signal) is recorded on the aforementioned DVD-ROM disc, after a predetermined video data or the like is recorded, by partially removing with a laser beam an aluminium film which has been deposited as a reflection film. That is, a BCA code is formed by removing an aluminium film of an area not affecting reproduction of a video data, audio data, or computer data which has been recorded as a pit signal on the disc.

More specifically, the BCA code is recorded so as to be overwritten on a pit string of dummy data recorded on an area located along the inner circumference of the disc.

As shown in FIG. 1, the BCA is recorded as bar-code stripes in the cicumferential direction of the optical disc, each stripe having a length of about 1 mm between 22.3 (+0/−0.4) mm to 23.50±0.05 mm from the center of the center hole of the disc. This code is recorded by way of RZ modulation method and is read out by an optical pickup serving for reproducing video data or audio data recorded on the optical disc.

Here, as shown in FIG. 2A, the aforementioned BCA area on the DVD-ROM disc consists of aluminium surfaces on which aluminium is deposited and areas from which the aluminium film has been removed by the laser beam. These areas are continuous to one another in the circumferential direction of the disc. As shown in FIG. 2B, an RF signal read out by scanning this BCA area has slits of the BCA code and mirror modulation caused by scanning the mirror surface by the laser spot.

In order to extract the BCA code alone from this RF signal, the RF signal is subjected to a processing for removing a high-frequency band component. As a result, as shown in FIG. 2B, a waveform affected by mirror modulation appears. In this case, it is impossible to set an appropriate threshold level for binarization, which in turn disables to extract a correct BCA code.

SUMMARY OF THE INVENTION

It is therefore an object of the present invention to provide an optical disc reproduction method and an optical disc reproduction apparatus capable of correctly extracting a BCA code without being affected by the mirror modulation of an RF signal.

According to the present invenion, there is provided an optical disc reproduction method including: a step of generating an RF signal from a predetermined area of an optical disc; a step of holding a peak value of an amplitude of the RF signal; a step of removing a higher frequency band component from the RF signal held; and a binarization step for carrying out binarization at a predetermined level the RF signal from which the higher frequency band component has been removed.

The binarization step fluctuates the predetermined level according to a level fluctuation of the RF signal from which the higher frequency band component has been removed.

According to another aspect of the present invention, there is provided an optical disc reproduction apparatus comprising: RF signal generating means for generating an RF signal from a predetermined area of an optical disc; peak hold means for holding a peak value of an amplitude of the RF signal; a low pass filter for removing a higher frequency band zone component from the RF signal held; and binarization means for binarizing at a predetermined level the RF signal from which the higher frequency band component has been removed.

The binarization means carries out the binarization of the RF signal from which the higher frequency band component has been removed using as the predetermined level a smoothed level of the RF signal from which the higher frequency band component has been removed.

According to still another aspect of the present invention, there is provided an optical disc reproduction apparatus for reproducing an optical disc identification information formed by partially removing a reflection film in an identification information area provided in a predetermined area of an optical disc, the apparatus including: an optical pickup for read out a data recorded as a pit signal on the optical disc; an RF amplifier for carrying out a predetermined signal processing to a reproduction signal corresponding to the identification information from the optical pickup; a peak hold circuit for holding a peak value of an amplitude of an RF signal outputted from the RF amplifier; a comparator for carrying out binarization of the RF signal outputted from the peak hold circuit, according to a predetermined threshold level; and a BCA circuit for extracting the identification information from the RF signal.

The RF amplifier outputs an RFDC signal from the optical pickup and an RFAC signal which is obtained from the RFDC signal by removing a DC component.

The BCA circuit further includes a filter having time constants according to a frequency band of the identification information and a frequency band of the pit signal, and extracting a frequency component corresponding to the identification information from the RF signal supplied from the peak hold circuit.

The comparator carries out binarization of the RF signal by using as a reference signal a threshold level which fluctuates according to a level fluctuation of the RF signal.

BRIEF DESCRIPTION OF THE DRAWINGS

FIGS. 6A–6C show waveforms of the RFAC signal which has been subjected to the peak hold and the low pass filter processing.

DETAILED DESCRIPTION OF THE PREFERRED EMBODIMENTS

Description will now be directed to preferred embodiments of the present invention with reference to the attached drawings.

Figure 1:
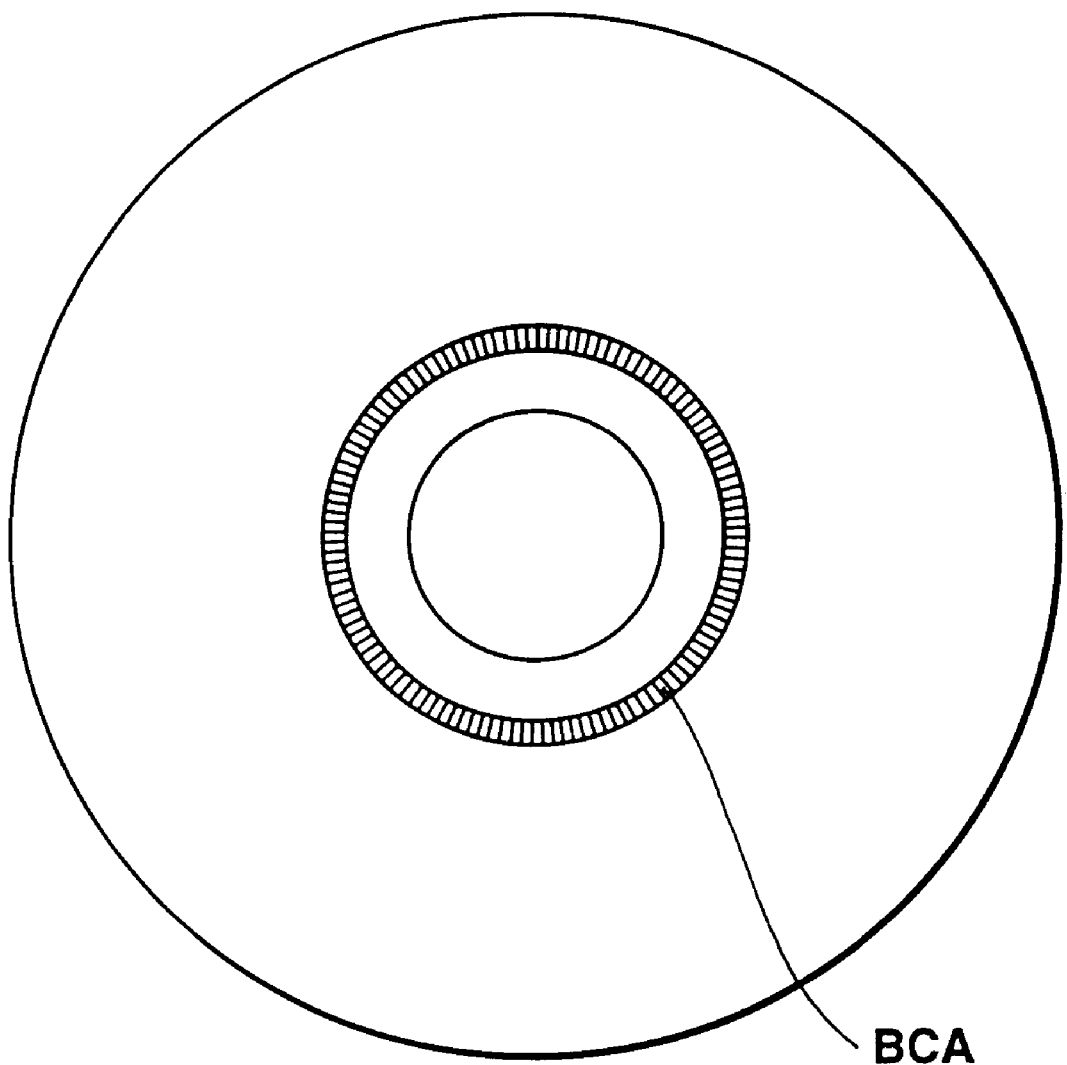
FIG. 1 shows a configuration of a BCA code.
Figure 2A:
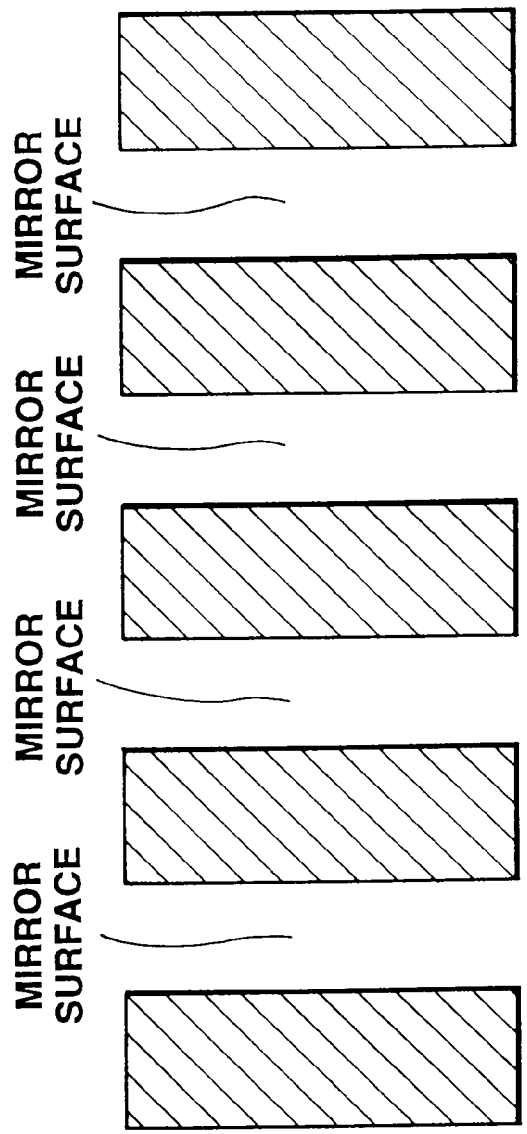
FIG. 2A shows a configuration of a BCA area.
Figure 2B:
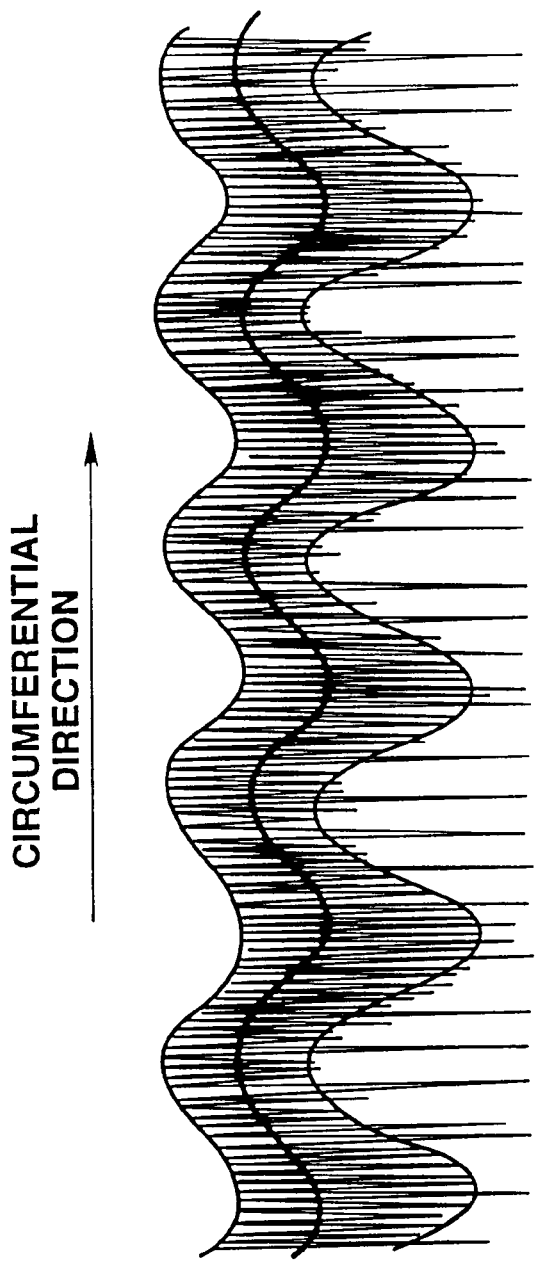
FIG. 2B shows a waveform affected by mirror modulation.
Figure 3:
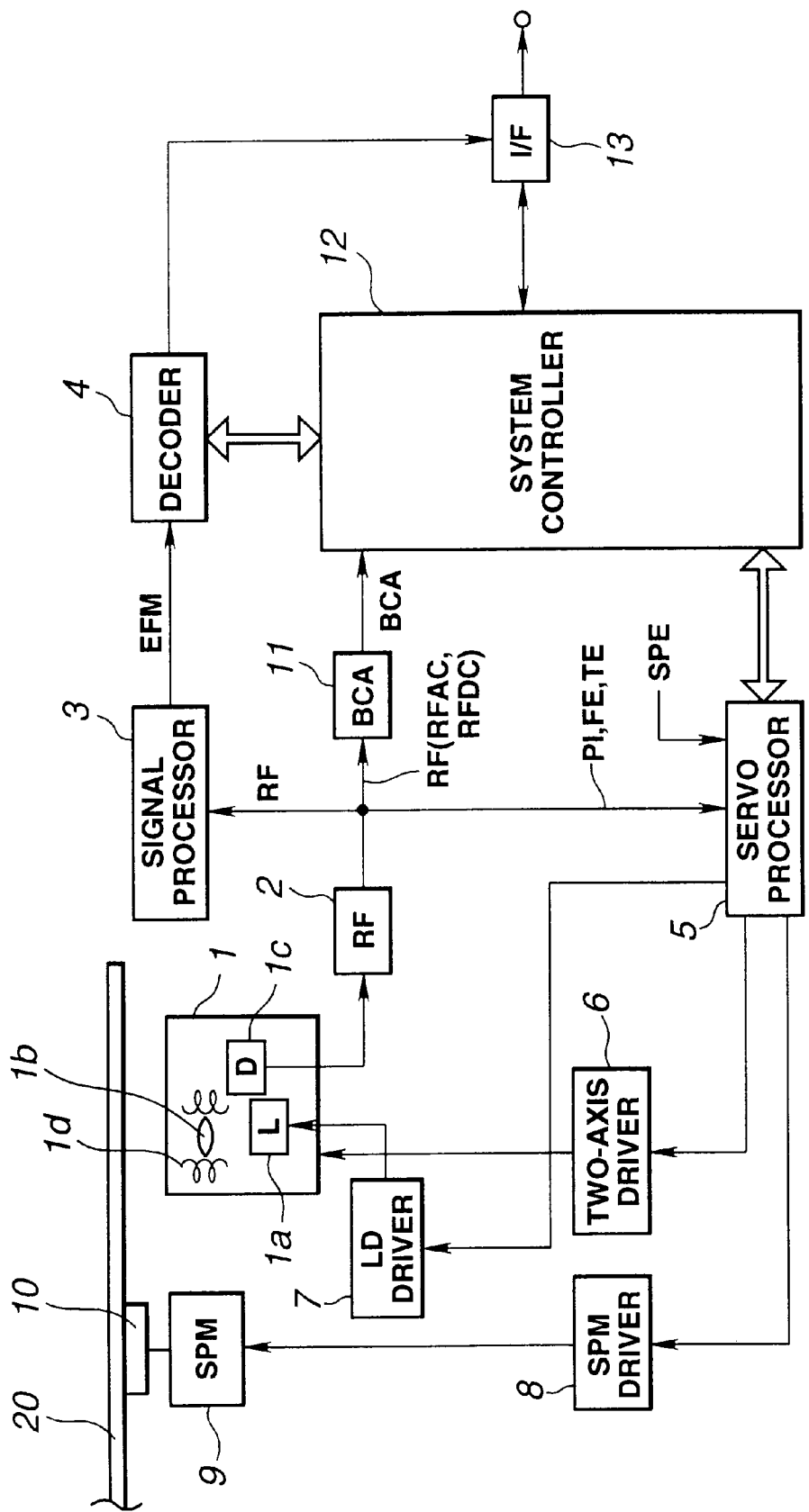
FIG. 3 is a block diagram showing a specific configuration of an optical disc reproduction apparatus according to the present invention.

FIG. 3 is a block diagram showing an optical reproduction apparatus according to an embodiment of the present invention, including: an optical pickup 1; an RF amplifier 2 for carrying out a predetermined signal processing according to an RF signal read out by the optical pickup 1; a signal processing circuit 3 for binarization of the RF signal from the RF amplifier 2; and a decoder 4 for decoding the binarized data.

The optical pickup 1 has: a laser diode 1a serving as a laser source having a center wavelength of 650 nm or 635 nm; an objective lens 1b of NA=0.6; and a detector 1c for detecting a signal read out from a DVD-ROM disc 20. The optical pickup 1 obtains a signal according to a quantity of light received and supplies the signal to the RF amplifier 2.

The RF amplifier 2 has a current-to-voltage conversion circuit, an amplification circuit, a matrix calculation circuit and the like, and generates necessary signals according to the signal from the detector 1c. The RF amplifier 2, for example, generates: an RF signal which is a reproduction signal; focus error signal FE for servo control; a tracking error signal TE; a pull-in signal PI which is a sO-called sum signal; and the like. Moreover, the RF amplifier 2 outputs as the RF signal, an original RF signal (RFDC signal) and an RF signal (RFAC signal) from which a DC component has been removed.

Figure 4:
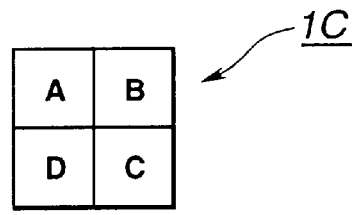
FIG. 4 shows configuration of a detector provided in an optical pickup.

As shown in FIG. 4, the detector 1c consists of four detection blocks A, B, C, and D. For example, the focus error signal FE is generated by calculation of (A+C)−(B+D). The pull-in signal PI is obtained by the calculation of (A+B+C+D). As for the tracking error signal TE, if in a case of 3-beam method, it is possible to use detectors E and F (not depicted) in addition to the aforementioned detector 1c, and carry out calculation of E−F, or it is also possible to generate a push-pull signal from the aforementioned four-block detector 1c.

The RF amplifier 2 supplies the signal processing circuit 3 with the RF signal and the servo processor 5 with the focus error signal FE, the tracking error signal TE, and the pull-in signal PI.

The signal processing circuit 3 carries out binarization of the aforementioned RF signal so as to generate a so-called FM signal for supply to the decoder 4. The decoder 4 carries out EFM demodulation, CIRC decoding and the like so as to reproduce data stored on the DVD-ROM disc 20.

Moreover, the aforementioned optical disc reproduction apparatus includes: a servo processor 5 for controlling various drivers according to the tracking error signal TE from the aforementioned RF amplifier 2; a two-axis driver 6 for driving two-axis mechanism 1d; an LD driver 7 for controlling light emitting of the laser diode 1a; a spindle motor driver 8; and a spindle motor 9 for rotating the DVD-ROM disc 20 mounted on a turn table 10.

The servo processor 5 controls the respective drivers according to an instruction from a system controller 12 which will be detailed later. That is, the servo processor 5 is supplied with a focus error signal FE and a tracking error signal TE from the RF amplifier 2 and a spindle error signal SPE from the decoder 4 or the system controller 12, so as to generate various drive signals such as focus, tracking, spindle for carrying out servo operation.

The two-axis driver 6 is supplied with a focus drive signal and a tracking drive signal from the servo processor 5. The two-axis driver 6 drives the two-axis mechanism 1d according to these drive signals. In this operation, a tracking servo loop and a focus servo loop are formed by the optical pickup 1, the RF amplifier 2, the servo processor 5, and the two-axis driver 6.

The spindle motor driver 8 is supplied with a spindle drive signal generated by the servo processor 5 according to a spindle error signal SPE. The spindle motor driver 8 supplies the spindle motor 9, for example, with a 3-phase drive signal according to the spindle drive signal, so as to control a constant linear velocity CLV or a constant angular velocity CAV.

Furthermore, the spindle motor driver 8 is supplied with a spindle kick/brake control signal from the system controller 12 and according to this signal, can generate the aforementioned spindle drive signal and control start or stop of the spindle motor 9. Consequently, the DVD-ROM disc 20 mounted on the turn table 10 is rotated at a constant linear velocity CLV or a constant angular velocity CAV by the spindle motor 9 during reproduction.

Moreover, the aforementioned optical disk reproduction apparatus includes: a BCA circuit 11 for extracting a BCA (Burst Cutting Area) code contained in the pull-in signal PI from the RF amplifier 2; the system controller 12 for controlling the aforementioned decoder 4 and the servo processor 5 and the like; and an interface 13 for outputting the reproduction signal decoded by the decoder 4, to an external device not depicted.

The system controller 12, according to an instruction from the external device via the interface 13, controls the decoder 4 and the servo processor 5. The interface 13 converts a signal from the decoder according to a predetermined conversion method for supply to the external device.

Moreover, the system controller 12, according to the BCA code extracted as will be explained later in the BCA circuit 11, identifies the DVD-ROM disc 20 and uses this information for a predetermined control. For example, the system controller 12 transmits this information via the interface 13 to the aforementioned external device so as to display the information.

Here, the BCA circuit 11 is supplied from the RF amplifier 2 with an RF signal (hereinafter, referred to as RFDC signal) and an RF signal from which a DC component has been removed (hereinafter, referred to as RFAC signal). The BCA circuit 11 can extracts a BCA code from the aforementioned RFAC or RFDC signal.

Figure 5:
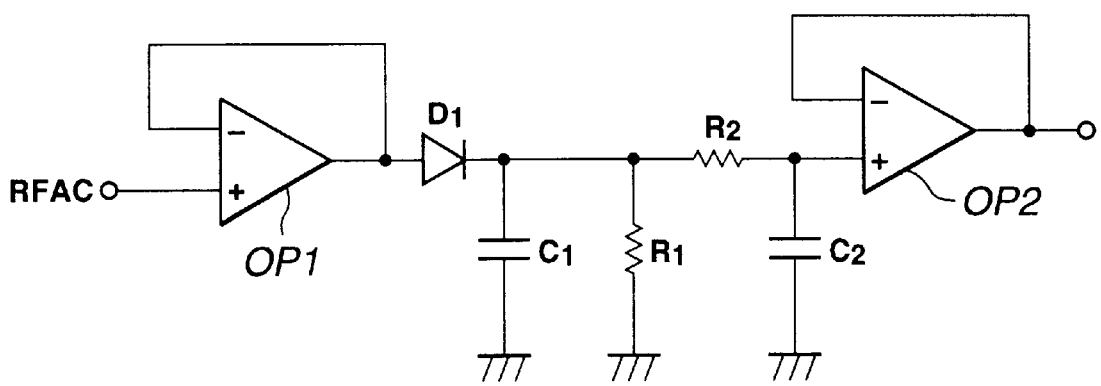
FIG. 5 is a block diagram showing a circuit for carrying out a low pass filter processing by peak-holding an RFAC signal.

When extracting a BCA code from an RFAC signal, as shown in FIG. 5, the BCA circuit 11 holds an amplitude peak of the RFAC signal with a capacitor C1 or resistor R1 and carries out a low-pass filter processing of this amplitude peak with a capacitor C2 and a resistor R2 before carrying out binarization, thus extracting a BCA signal from the RFAC signal.

More specifically, as shown in FIG. 6A, the RFAC signal is affected by the mirror surface, causing mirror modulation and generating slits due to the BCA code. This RFAC signal, in order to lower the input impedance, is subjected to half-wave rectification by the diode D1 via a buffer consisting of an operation amplifier OP1. As shown in FIG. 6B, this RFAC signal is peak-held according to a time constant of the resistor Rl (=4.7 kΩ) and the capacitor C1 (=470 pF) which are connected in parallel. As shown in FIG. 6C, the RFAC signal is outputted via a low-pass filter consisting of the resistor R2 and the capacitor C2 and the buffer consisting of an operation amplifier OP2.

Values of the aforementioned resistors R1 and R2 and the capacitors C1 and C2, i.e., time constants of the respective circuits are determined according to the frequency band of the reproduction signal of the BCA code and the frequency band of the reproduction signal of data recorded in advance as a pit information.

More specifically, the reproduction frequency of the BCA code when the disc is rotated at a particular rpm, is approximately 30 KHz, and the dummy data which is reproduced simultaneously has a reproduction frequency of approximately 1 MHz to 4.5 MHz. For this, it is possible to determine the values of the resistor R2 and the capacitor C2 so as to make 100 kHz the cut-off frequency of the aforementioned low pass filter, thus enabling extraction of a frequency component corresponding to the BCA code.

Figures 7A, 7B, 7C, 7D:
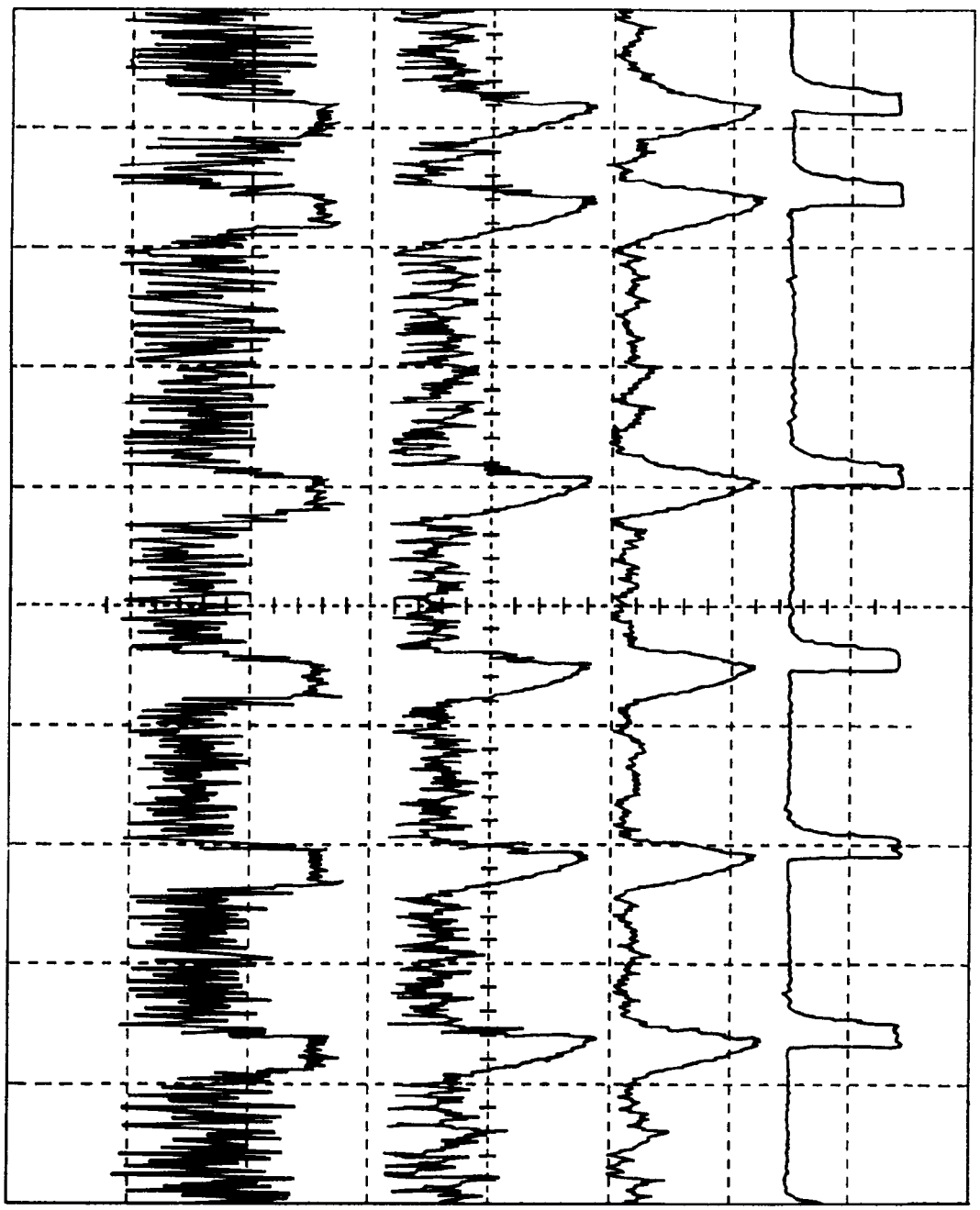
FIGS. 7A–7D show waveforms of the RFAC signal which has been subjected to the peak hold, the low pass filter processing, and binarization.

It should noted that FIG. 6A, 6B, and 6C with their time axis range multiplied by 5 are respectively shown in FIG. 7A, 7B, and 7C. When binarization is carried out on the RFAC signal which has been subjected to the low pass filter processing, it is possible to extract the BCA code as shown in FIG. 7D. The binarization of this RFAC signal will be detailed later.

Figure 8:
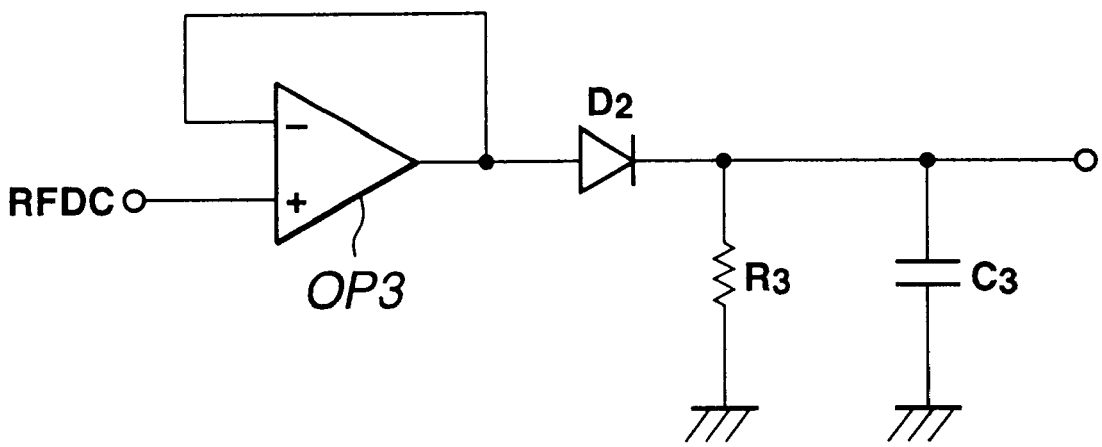
FIG. 8 is a block diagram showing a circuit for peak hold of the RFDC signal.

Moreover, when extracting a BCA code from the DC signal, as shown in FIG. 8, the BCA circuit 11 holds the amplitude peak of the RFDC signal with a resistor R3 and a capacitor C3 for binarization, thus enabling to extract a BCA code.

Figures 9A, 9B:
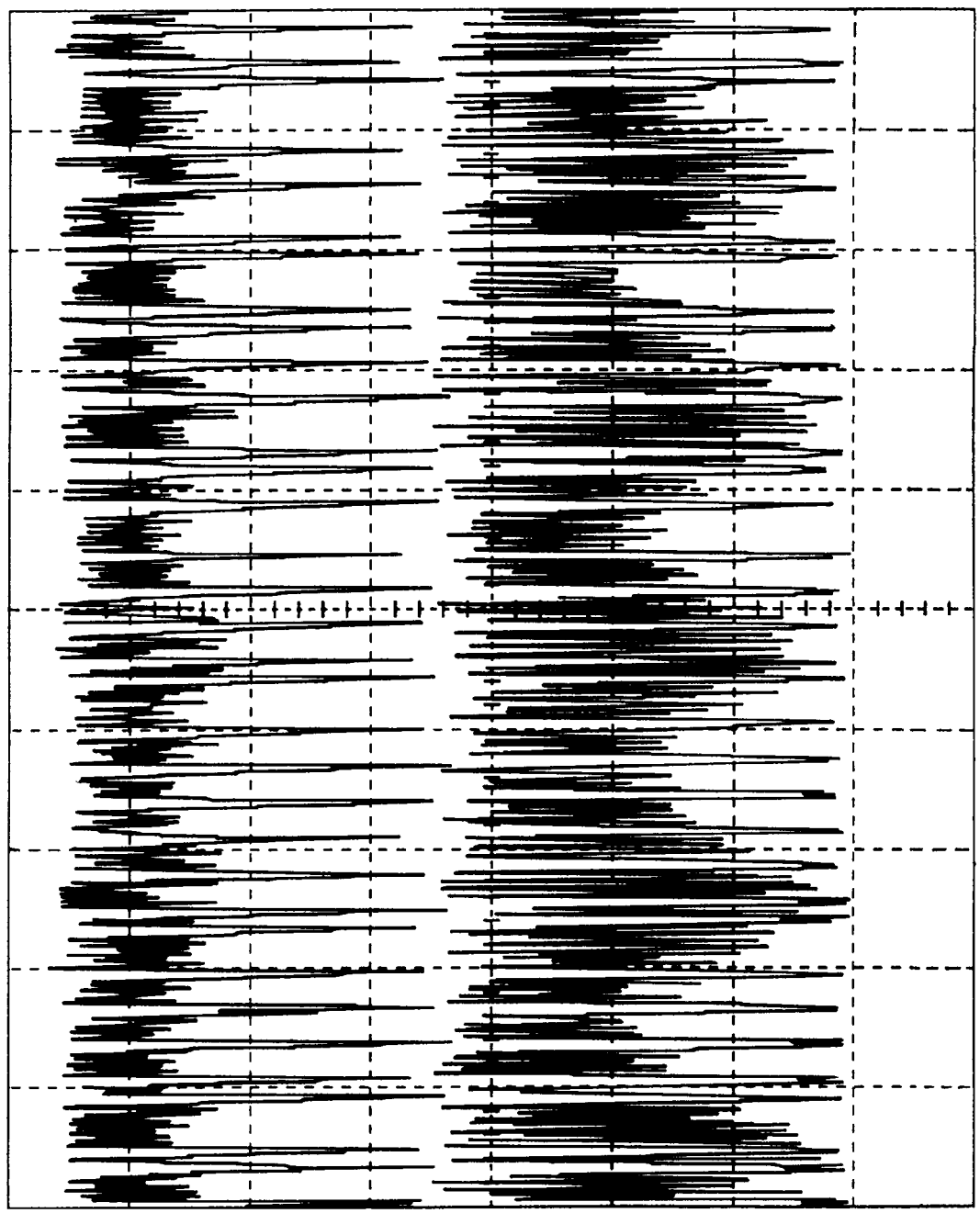
FIGS. 9A and 9B show waveforms of the RFDC signal which has been subjected to the peak hold.
Figures 10A, 10B:
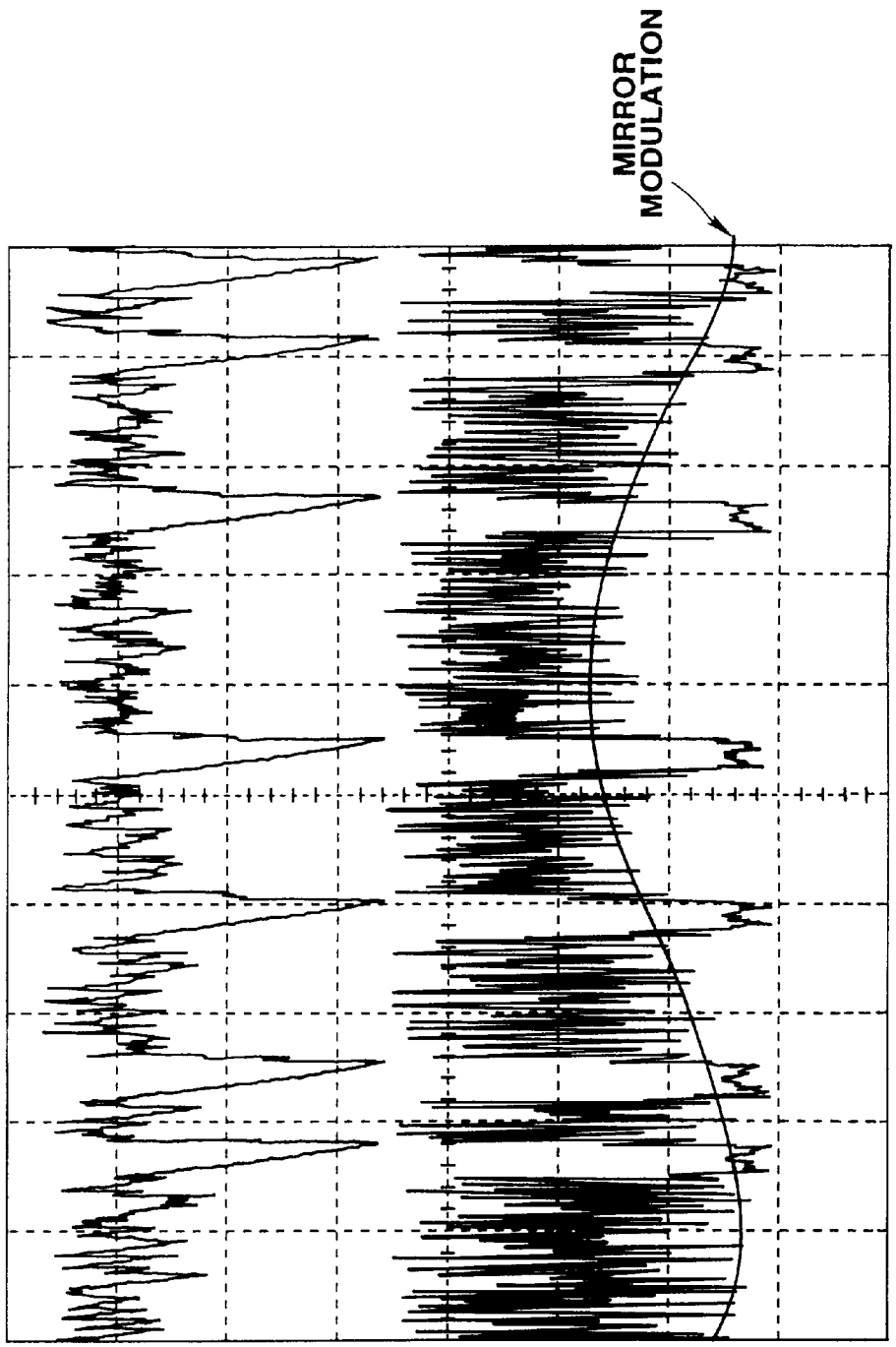
FIGS. 10A and 10B show waveforms of the RFDC signal which has been subjected to the peak hold.

More specifically, as shown in FIG. 9A, the RFDC signal is affected by the mirror surface, generating mirror modulation as well as slits due to the BCA code. This RFDC signal is fed to a buffer consisting of an operational amplifier OP3 so as to be impedance-rectified and half-wave rectified by the diode D2. As shown in FIG. 9B, this RFDC signal is peak-held according to the time constants of the resistor R3 (=4.7 kΩ) and a capacitor C3 (=1000 pF) which are connected in parallel. In this case also, the resistor R3 and the capacitor C3 have values which are determined according to the reproduction frequency of the BCA code (reproduction signal periodicity) and the reproduction frequency of the pit signal as has been explained with reference to FIG. 5. It should be noted that FIG. 9A and FIG. 9B with their time axis range multiplied by 5 are shown in FIG. 10A and FIG. 10B, respectively. When the peak-held RFDC signal is subjected to binarization, the BCA code is extracted.

Figure 11:
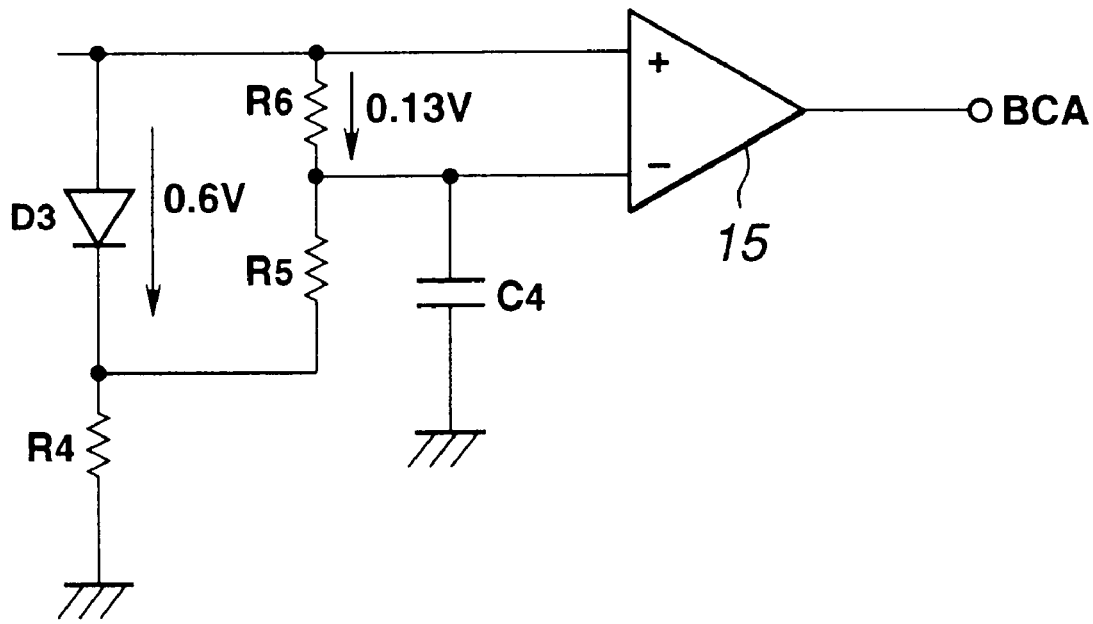
FIG. 11 is a block diagram showing a circuit for carrying out binarization of an RF signal.

The aforementioned RFAC signal which has been subjected to the low pass filter processing and the RFDC signal (hereinafter, referred to as an RF signal) which has been peak-held are binarized by a BCA comparator as shown in FIG. 11.

More specifically, the BCA comparator 15 has a non-inverting input terminal which is supplied with the aforementioned RF signal and an inverting input terminal which is supplied with a reference signal serving as a threshold level of the binarization. The diode D3 is connected to an input terminal of the RF signal and grounded via a resistor R4 (=1 kΩ). The voltage drop of the diode D3 is divided by a resistor R5 (=82 kΩ) and a resistor R6 (=22 kΩ) and smoothed by a capacitor C4 (=1000 pF) for supply as the aforementioned reference signal to the aforementioned inverting input terminal. Consequently, the BCA comparator 15 can carry out binarization at a constant threshold level even if supplied with the RF signal which changes its level.

Figures 12A, 12B:
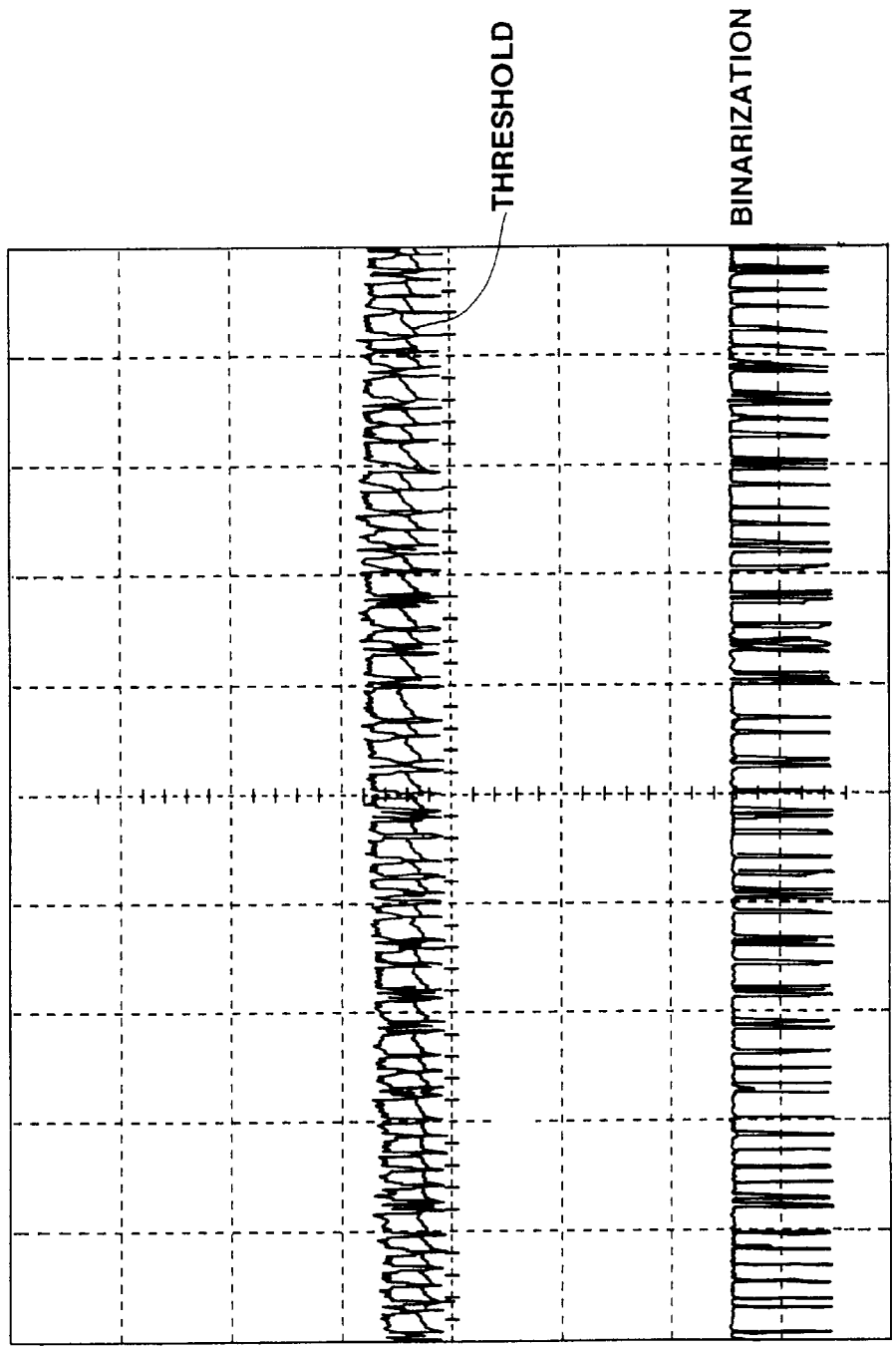
FIGS. 12A and 12B show a relationship between the RF signal and the threshold level.
Figure 13:
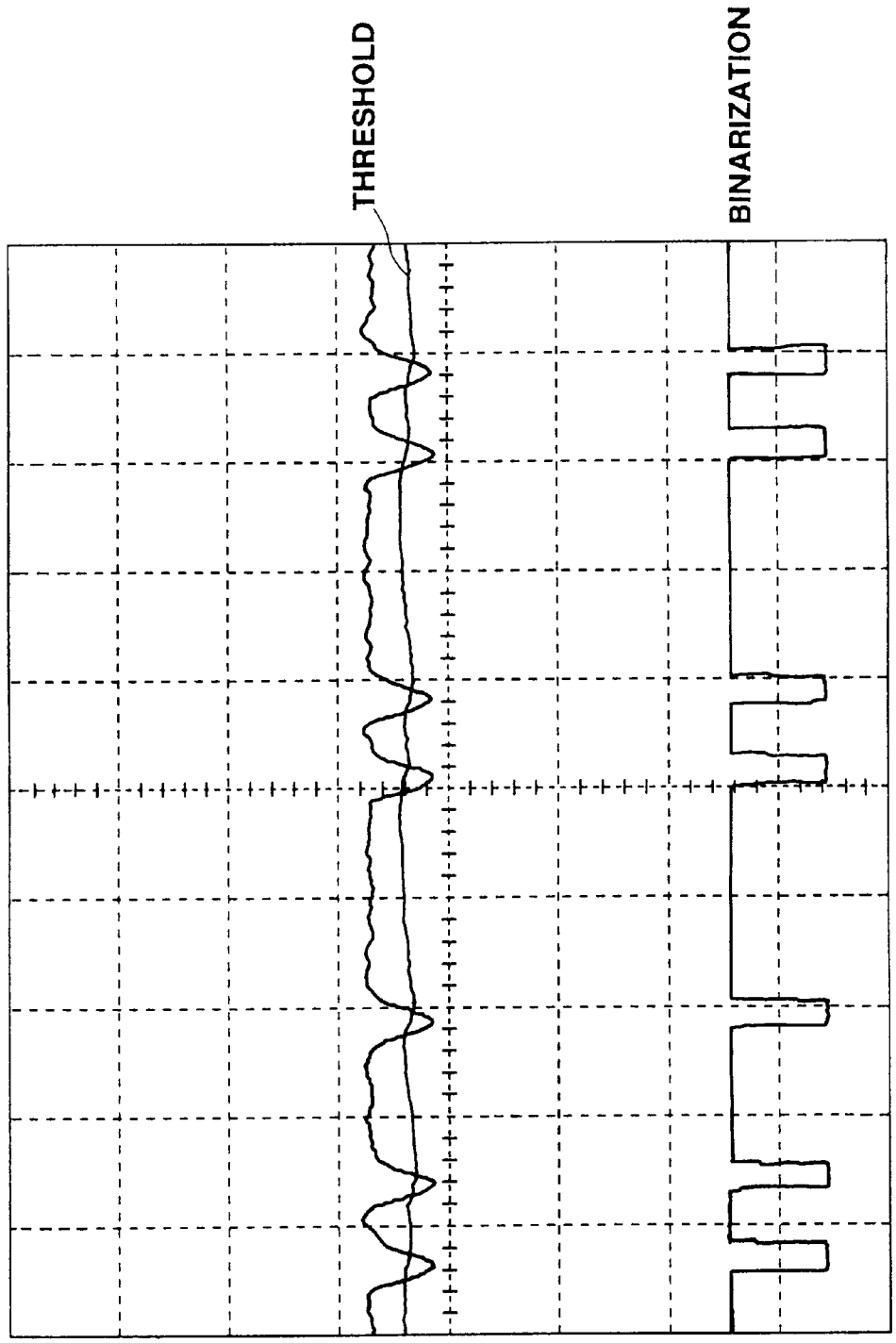
FIG. 13 shows a relationship between the RF signal and the threshold level.
Figure 14:
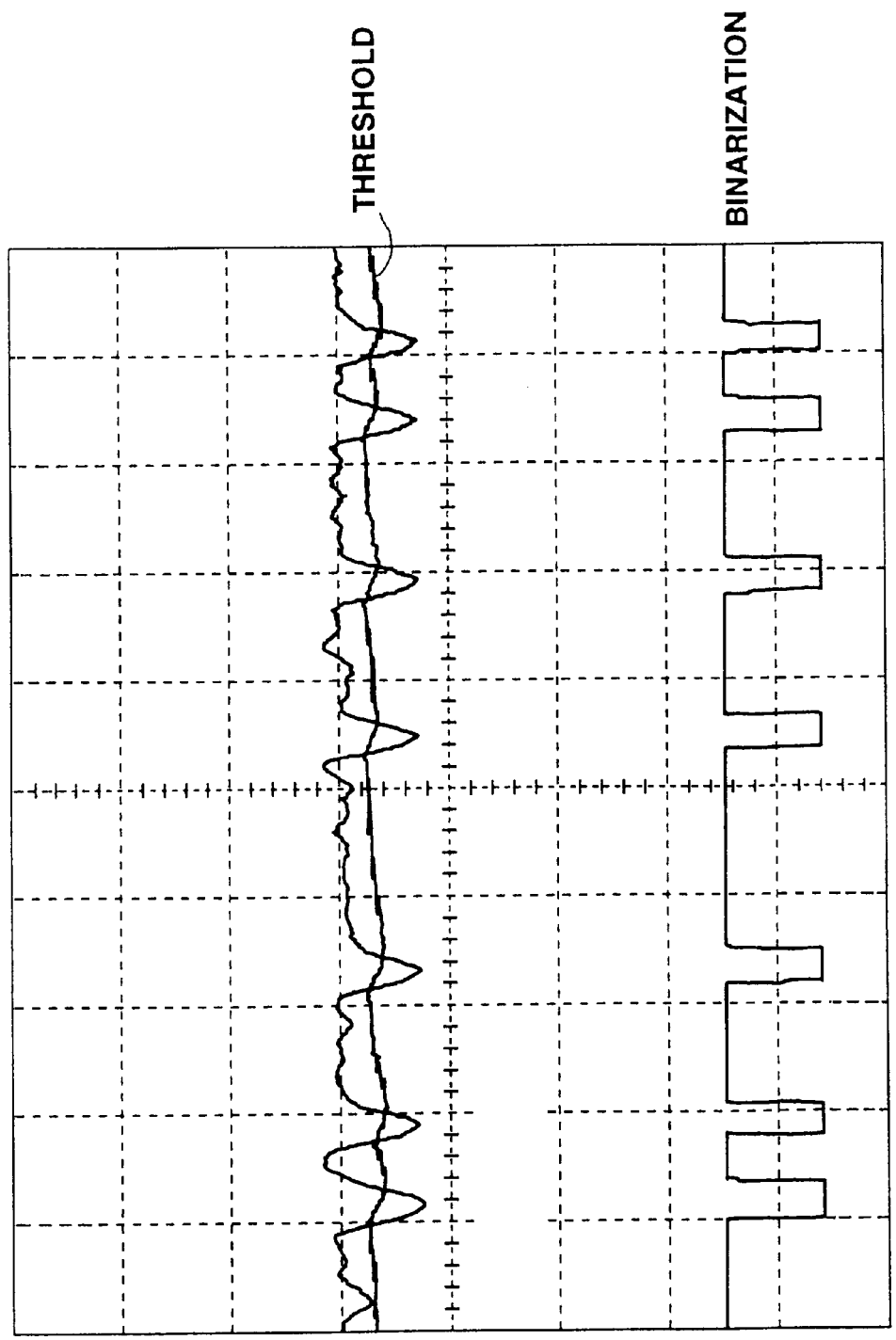
FIG. 14 shows a relationship between the RF signal and the threshold level.

For example, as shown in FIG. 12A, the threshold level fluctuates according to the fluctuation of the RF signal. As shown in FIG. 12B, the BCA comparator 15 can carry out binarization according to this threshold level. Moreover, FIG. 13 shows a waveform obtained when the BCA area is enlarged so as to have a power P=150 μW; and FIG. 14 shows a waveform when the BCA area is enlarged so as to have P=230 μW.

As has been described above, the aforementioned optical disc reproduction apparatus peak-holds an RF signal read out from an optical disc before carrying out low pass filter processing of the RF signal, thus enabling the elimination of effects from the mirror modulation and to carry out an optimal signal processing in comparison to a case which directly carries out low pass filter processing of the RF signal. Consequently, the aforementioned optical disc reproduction apparatus can carry out binarization by setting an optimal threshold level for this RF signal and reproduce a BCA code in a complete state. This enables a user to recognize individual identification information of a DVD-ROM disc 20, for example.

It should be noted that the present invention is not to be limited to the aforementioned embodiment but can be modified in various ways within a scope of the present invention, including modification of the resistor values and the capacitor values.

As has thus far been described in detail, in the optical disc reproduction method according to the present invention, an amplitude peak of an RF signal is held, and a higher frequency band component of the peak-held RF signal is eliminated. The RF signal from which the higher frequency band component has been removed is subjected binarization at a predetermined level. Thus, it is possible to accurately extract a BCA code without being affected by the mirror modulation of the RF signal Moreover, according to the aforementioned optical disc reproduction method, the aforementioned predetermined level as a binarization reference is fluctuated according to the level fluctuation of the RF signal from which a higher frequency band component has been removed, thus enabling to accurately extract a BCA code even if an output of the RF signal is changed.

In the optical disc reproduction apparatus according to the present invention, an amplitude peak of an RF signal is held by the peak hold means so as to remove a higher frequency band component before carrying out binarization of this RF signal at a predetermined level by using binarization means, thus enabling the accurate extraction of a BCA code without being affected by mirror modulation of the RF signal.

Moreover, in the aforementioned optical disk reproduction method, by smoothing the level of the RF signal from which a higher frequency band component has been removed, so as to be the aforementioned predetermined level, which is used for binarization of the aforementioned RF signal from which the higher frequency band component has been removed, thus enabling accurate extraction of a BCA code even if an output of the RF signal is changed.

What is claimed is:

1. An optical disc reproduction apparatus for reproducing an optical disc identification information formed by partally removing a reflection film in an identification information area provided in a predetermined area of an optical disc, said apparatus comprising:

an optical pickup for read out a data recorded as a pit signal on said optical disc;

an RF amplifier for carrying out a predetermined signal processing to a reproduction signal corresponding to said identification information from said optical pickup; and a BCA circuit having a peak hold circuit for holding a peak value of an amplitude of an RF signal outputted from said RF amplifier; and a comparator for carrying out binarization of the RF signal outputted from said peak hold circuit, according to a predetermined threshold level, wherein said BCA circuit extracts said identification information from said RF signal.

2. An optical disc reproduction apparatus as claimed in claim 1, wherein said RF amplifier outputs an RFDC signal from said optical pickup and an RFAC signal which is obtained from the RFDC signal by removing a DC component.

3. An optical disc reproduction apparatus as claimed in claim 1, wherein said BCA circuit further includes a filter having time constants according to a frequency band of said identification information and a frequency band of said pit signal, and extracts a frequency component corresponding to said identification information from the RF signal supplied from said peak hold circuit.

* * * * *

UNITED STATES PATENT AND TRADEMARK OFFICE
CERTIFICATE OF CORRECTION

PATENT NO.: 6,034,937
DATED: March 7, 2000
INVENTOR(S): EIJI KUMAGAI

It is certified that an error appears in the above-identified patent and that said Letters Patent is hereby corrected as shown below:

In Col. 7, line 15, please replace "partally" with --partially--.

Signed and Sealed this

Tenth Day of April, 2001

Attest:

NICHOLAS P. GODICI

Attesting Officer     *Acting Director of the United States Patent and Trademark Office*